United States Patent [19]
Workman

[11] 3,738,356
[45] June 12, 1973

[54] INTRAVENOUS PRESSURE MONITOR
[75] Inventor: Harold W. Workman, Jackson, N.J.
[73] Assignee: Iowa State University Research Foundation, Inc., Ames, Iowa
[22] Filed: Jan. 22, 1971
[21] Appl. No.: 108,756

Related U.S. Application Data
[63] Continuation-in-part of Ser. No. 703,061, Feb. 5, 1968, abandoned.

[52] U.S. Cl. .......................... 128/2.05 D, 73/398 R
[51] Int. Cl. ............................................... A61b 5/02
[58] Field of Search ................. 128/2.05 D, 2.05 E, 128/2.05 N; 73/398 R

[56] References Cited
UNITED STATES PATENTS

| | | | |
|---|---|---|---|
| 3,038,465 | 6/1962 | Allard et al. .................... | 128/2.05 D |
| 2,780,101 | 2/1957 | Kinkel .............................. | 73/398 R |
| 3,062,202 | 11/1962 | Hyman et al. ................. | 128/2.05 D |
| 3,196,375 | 7/1965 | Jones .............................. | 128/2.05 D |
| 3,364,749 | 1/1968 | Sipin ............................... | 73/398 R |

Primary Examiner—Kyle L. Howell
Attorney—Dawson, Tilton, Fallon & Lungmus

[57] ABSTRACT

An air-filled catheter transmits an intravenous blood pressure to a pressure-sensing transducer having a coil connected to a flexible membrane or diaphragm which defines one side of the catheter chamber. A digital feedback signal is generated in response to displacement of the membrane; and this feedback signal is used to energize the coil and drive the membrane back to its original position. A highly sensitive (i.e. compliant) diaphragm is used; and the high repetition rate of the feedback signal limits displacement of the diaphragm within very small tolerances to reduce the compliance error of the diaphram. The average value of the current in the driving coil necessary to displace the diaphragm to offset the catheter pressure is a measure of the intravenous pressure.

4 Claims, 5 Drawing Figures

PATENTED JUN 12 1973
3,738,356
SHEET 1 OF 2
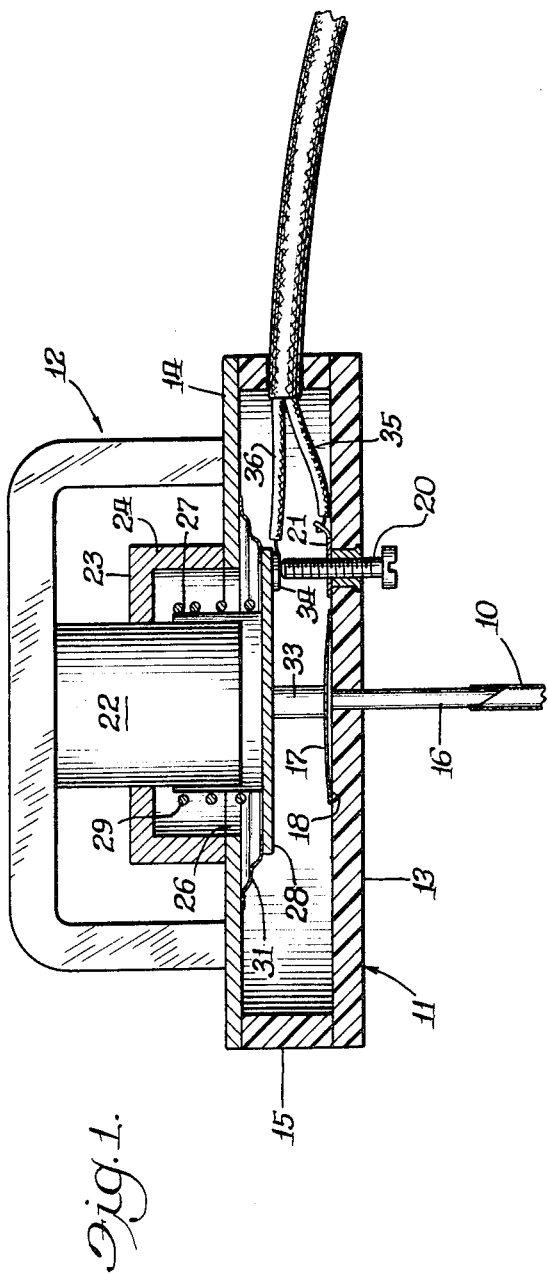
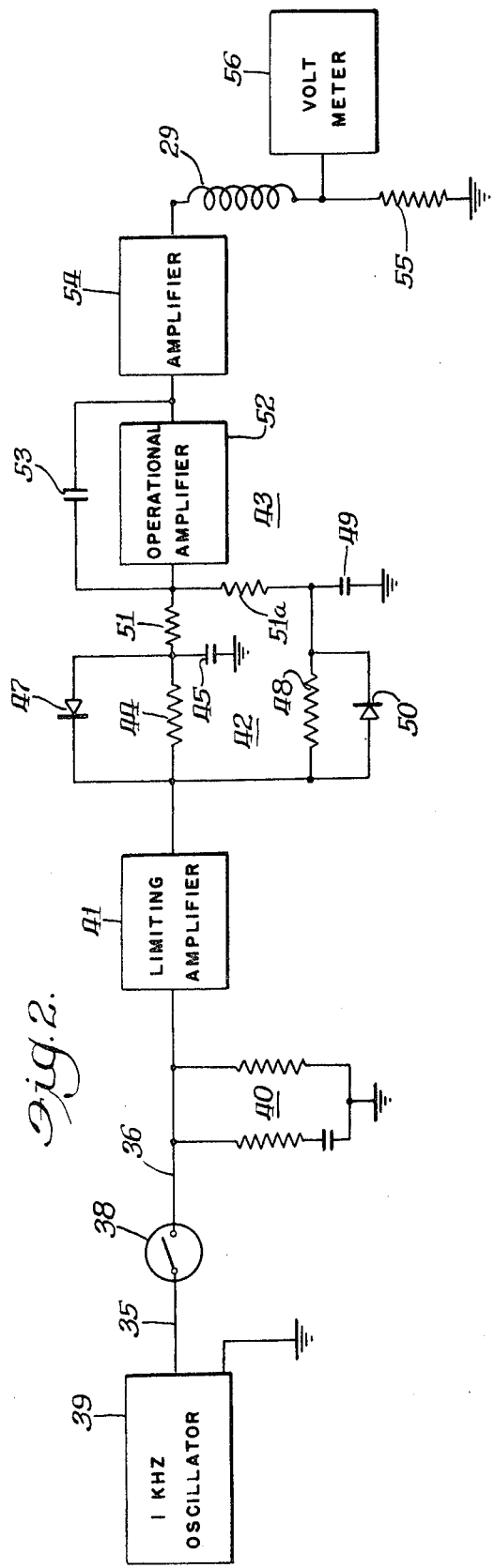
Inventor:
Harold W. Workman
By: Dawson, Tilton, Fallon & Lungmus
Attys.

INTRAVENOUS PRESSURE MONITOR

RELATED APPLICATIONS

This is a continuation-in-part application of my application filed Feb. 5, 1968, Ser. No. 703,061 and entitled "Intravenous Pressure Monitor" now abandoned.

BACKGROUND

The present invention relates to apparatus for measuring blood pressure; more particularly, it relates to the continuous measurement of blood pressure by means of a catheter inserted in a vein.

The water-filled manometer has been used as a simple device for measuring venous pressure. In particular, it is used during surgical procedures by an anesthesiologist to continuously monitor the condition of a patient.

The manometer consists of a fluid-filled catheter and a graduated glass tube. One end of the catheter is placed into the vein, and the other end is connected to the graduated tube which is also filled with water or saline. The height to which the water level rises in the tube is indicative of the venous pressure at the end of the catheter.

The major drawback in the water-filled manometer is that the catheter connecting the point of measurement in a vein to the graduated tube of the manometer is filled with a liquid. Gravity acting on the liquid in the catheter generates a hydrostatic pressure which adds to the reading of the manometer. It is frequently difficult to ascertain with any degree of certitude the amount of this hydrostatic pressure, and this inadequacy constitutes a main factor to the inaccuracy of conventional water-filled manometer.

The hydrostatic pressure head of the water-filled connecting tube may be minimized in a manometer if the zero mark on the manometer is placed on a level with the catheter tip thus providing a reference for the manometer which is equal to the catheter tip location. Raising or lowering of the manometer tube with respect to the catheter tip will cause a linear displacement in the readings of the actual pressure.

It is difficult to fix the reference level within an acceptable tolerance for the range of pressure value to be measured since the tip of the catheter is, of course, buried in a vein and not capable of being seen. Further, the location at which the catheter tip is placed may be moved during the measurement thus creating an additional hydrostatic pressure head which will cause measurement error.

One method of measuring pressure with high accuracy (although not applied to the measurement of blood pressure so far as is known) includes an apparatus with a differential transducer chamber for detecting the differences between the measured pressure and a pressure generated by a column of mercury. A servomechanism physically raises or lowers the column of mercury to null the differential transducer.

In this system, the differential transducer includes a differential transformer as the sensing element. The movable core of the transformer floats on a surface of mercury, and this mercury communicates with the column of mercury which is raised and lowered. The space above the mercury surface is filled with ethanol, and the pressure to be measured is applied to the ethanol. Changes in the core position due to changes in the pressure of the ethanol are detected, and the servomechanism displaces the column of mercury until the floating core is returned to a null position. This system has a very low frequency response capability (0.2 Hz.); and it has a crucial dependence on gravity requiring proper orientation of the equipment. The total volume of ethanol is great enough so that it could not be replaced by air, as required in a venous pressure monitor. This system is reported by G. Oertal in The Review of Scientific Instruments, Vol. 34, no. 10, Oct. 1963.

An improved system thus requires simplicity, sensitivity, the ability to continuously record pressure and a wider frequency response.

SUMMARY

The present invention uses an air-filled catheter to eliminate the above-described problem of a fluid-filled catheter which creates an undesirable pressure head. In the present invention, pressure is transmitted across a fluid-air meniscus at the catheter tip and through the air in the catheter to a very sensitive diaphragm. An electrical signal is generated in response to the movement of the diaphragm; and this signal energizes a feedback system for producing a force to equalize the pressure being measured and thus move the diaphragm back within the predetermined tolerances. In this way a highly sensitive (that is, flexible) diaphragm may be used while minimizing the system error caused by diaphragm compliance, as explained within.

Other features and advantages of the present invention will be obvious to persons skilled in the art from the following detailed description of a preferred embodiment accompanied by the attached drawing.

THE DRAWING

FIG. 1 is a schematic diagram, partially in block form, of a system according to the present invention;

FIG. 2 is a horizontal cross section view of a preferred transducer arrangement;

DETAILED DESCRIPTION

Figure 3A:
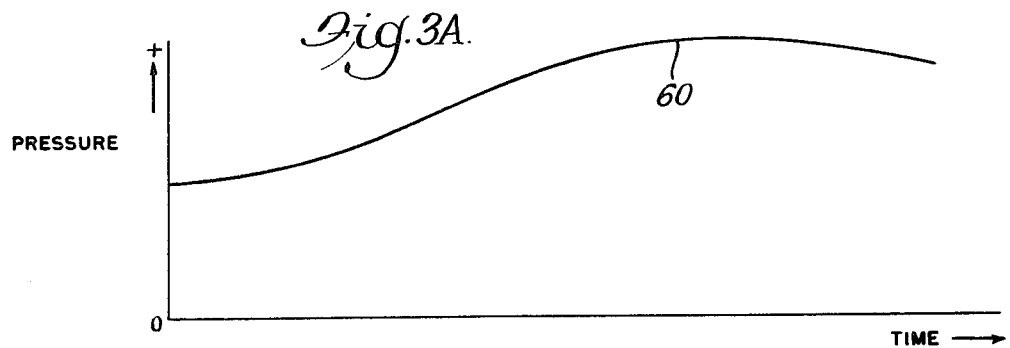
FIG. 3A is a graph of a pressure in a catheter.

As already mentioned, it is the principal object of the present invention to measure intravenous pressure with an air-filled catheter rather than a liquid-filled catheter, and thus eliminate the error introduced by hydrostatic pressure. Briefly, an air-filled catheter is used to transmit pressure from one end to a transducer at the other end. The catheter or tube has an open tip to be inserted in the vein. The transducer includes a first enclosed volume of air (herein sometimes referred to as the catheter volume) communicating with the catheter, and a second volume of air (herein sometimes referred to as the reference volume) separated from the first volume by means of a diaphragm. The pressure in the first volume is nearly equal to the pressure sensed at the tip of the catheter, and circuitry generates an output signal proportional to the difference between the first pressure and the reference pressure.

The pressure at the catheter is not exactly the same as the pressure within the closed chamber with which it communicates because of the pressure drop due to the column of liquid in the catheter and to the extra pressure created by the meniscus. The fluid inflow into the chamber is offset by the compression of the gas in these closed-volume catheter systems. If the pressure in the fluid being measured increases, the greater will be the corresponding fluid inflow into the catheter. Further, the volume in the closed chamber is changed due to movement of the separating diaphragm. The displacement of the diaphragm is reflected entirely by an equal inflow of fluid into the catheter or an equal outflow of fluid out of the catheter, depending upon the direction of the diaphragm displacement.

As I have analyzed the problem in a thesis submitted to The Graduate Faculty of The Iowa State University of Science and Technology, Ames, Iowa in partial fulfillment for the requirement for the Degree of Master of Science, there are three major sources of error in an air-filled catheter transducer of this type. One source of error is that which is due to capillary pressure, that is, the net pressure caused by surface tension of the fluid in the catheter. This error, however, is a constant and it can be subtracted directly from the output. At any rate, there is no great difficulty in compensating for this fixed error.

A second source of error is due to the compressibility of the gas in the catheter and in the chamber with which the catheter communicates. This error is directly proportional to the initial volume of the closed section of the catheter system.

A third major source of error is caused by the compliance of the diaphragm in the transducer. A high value of compliance indicates that the diaphragm is highly flexible.

The displacement of the diaphragm may be a very large source of error unless the diaphragm is selected as having minimal compliance; however, this is at the cost of system sensitivity. By employing a large diaphragm, a greater force can be produced on a measuring gauge to enhance sensitivity, but a large diaphragm will require a corresponding large volume of enclosed air thus increasing the second source of error in the system. A very rigid diaphragm requires a great amplification of its motion in order to convert it to a meaningful signal.

Referring now to the drawing, and particularly to FIG. 1, a catheter is designated by reference numeral 10; and it is adapted at its free end (not shown) in a conventional manner for insertion in a vein. Preferably, the catheter 10 is flexible enough to be handled and used properly, but it should be sufficiently rigid so that external pressures do not alter the internal volume by distorting the sides. Further, the catheter should confine a minimum volume for reducing the second of the above-identified errors in the system. However, the diameter of the tubing 10 at the meniscus must be large enough to keep the capillary pressure below at least two centimeters of water. Lower capillary pressures are desirable if feasible. The diameter of the catheter must not be so large that the catheter cannot be introduced into the vein, of course. A preferred catheter is that of P.E. 90 polyethelene tubing having an inside diameter of 0.034 in. and an outside diameter of 0.050 in. The length is 50 centimeters. The confined volume of the catheter can be further reduced if the major portion of its length comprises a tubing of narrower inside diameter. The instrument is insensitive to changes in the dimensions of the catheter; and it is sensitive only to the dimensions of the catheter tip, the diameter of which influences the capillary pressure. In addition, the catheter should be treated according to conventional techniques to avoid clotting of the blood it contacts.

The housing for the transducer includes a lower section generally designated 11 and an upper section generally designated 12 secured to each other as by welding or adhesive bonding. Preferably the sections 11 and 12 are disc-shaped.

The lower section 11 of the housing includes a bottom plate 13, a top plate 14 (to which the upper section 12 is secured) and a cylindrical wall member 15. The top section 12 has an inverted cup shape and is of integral construction.

The catheter is force-fitted on a needle 16 which is embedded in the bottom plate 13. A flexible diaphragm or membrane 17 covers the exit or upper aperture defined by the needle 61, and the membrane 17 is secured by adhesive bonding at the periphery of its lower surface (as at 18) to the upper surface of the bottom plate 13 of the lower section 11 of the housing.

An upwardly-projecting stud 20 is threadably received in the bottom plate 13 for upward and downward adjustment, A conducting lug 21 is attached to the upper surface of the bottom plate 13 in electrically conducting relation with the stud 20.

A cylindrical magnet, generally designated by reference numeral 22, is fixed to the upper cup-shaped section 12 of the housing and extends axially thereof toward the lower section 11. An interior cup-shaped support member 23 including an annular wall member 24 attached to the top plate 14 further supports the magnet 22. The top plate 14 defines an aperture 26 through which the magnet 22 extends.

A cylindrical coil form 27 is slidably fitted about the magnet 22 and is attached at its lower section to a circular plate 28 to move therewith. The coil form 27 supports a wound coil 29 which, when excited with electrical current will move axially of the magnet 22 in a direction determined by the current flow in the coil 29. The circular plate 28 lies within the cavity defined by the lower section 11 of the housing; and it is sealed with the top plate 14 of the lower section 11 by means of an annular, corrugated member 31, preferably made of stiff paper. Thus, the entire assembly including coil form 27, coil 29 and circular plate 28 respond in the manner of a conventional audio speaker when the coil 29 is energized. A rod-shaped dowel 33 is adhesively bonded between the circular plate 28 and the top surface of the diaphragm 17. It will be appreciated that the exact shape of the diaphragm 17 has been exaggerated for purposes of illustration, and that ordinarily, the dowel 33 is such that the diaphragm 17 is displaced only a very short distance from the mouth of the needle 16. However, the diaphragm 17 is located somewhat from the mouth of the needle 16 so as to be capable of being displaced in both directions from the position illustrated in the drawing and thereby enable the system to measure negative as well as positive pressures.

An electrical contact 34 is secured to the bottom surface of the circular plate 28 above the stud 20; and a pair of conducting wires 35 and 36 are connected respectively to the lug 21 and the contact 34. The wires 35 and 36 are then coupled through the sidewall 15 of the lower section 11 of the housing. It will be observed that when the contact 34 is lowered to a condition so as to engage the stud 20, an electrical short circuit will exist between the wires 30 and 36 which, as shown, are insulated from one another.

ELECTRICAL SYSTEM

Referring now to FIG. 2, the stud 20 and the contact 34, which essentially provide a make/break electrical switch, are schematically represented by means of the switch designated 38. The previously-described wires 35 and 36 are connected to either side of the switch 38 as shown. The output signal of an oscillator 39 having a frequency of 1000 Hz. feeds the switch 38 through the wire 35. The oscillator 39 is of conventional design, and is used primarily to yield an even wear on the contacts of the switch 38. From a theoretical standpoint, alternating current or voltage need not be used here.

The other side of the switch 38 is coupled to ground through a conventional arc-suppression network generally designated 40 and to a limiting amplifier 41. The function of amplifier 41 is to generate a digital signal having only two discrete output voltage levels. One level is positive and indicates that the switch 38 is open (i.e., the limiting amplifier 41 is not receiving the output signal of the oscillator 39), and the other level is negative and indicates that the switch 38 is closed (the limiting amplifier 41 is energized by the oscillator 39). The limiting amplifier 41 may be a conventional rectifier circuit (if an oscillator is used for the signal input) which feeds a Schmitt Trigger circuit to operate in the manner disclosed. In the illustrated embodiment, the output of the limiting amplifier 41 is a negative voltage if the switch 38 is closed and at a positive voltage if the switch 38 is open.

A nonlinear or saturating filter section, generally designated 42 receives the output of the limiting amplifier 41 and couples it to an integrator section, generally designated 43. The nonlinear filter 42 includes a first resistance 44 and capacitor 45 to ground and a diode 47 connected across the resistor 44. A second resistor 48 and capacitor 49 are also coupled to ground with a second diode 50 connected across resistor 48 in complementary relation to that of the diode 47. The signal side of the capacitors 45 and 49 are then connected to the input of the integrator section 43 namely isolation resistors 51 and 51a which are in turn connected to the input of an operational amplifier 52 having a capacitor 53 coupled directly between its input and output terminals to provide an integrating amplifier, as is commonly known. The input to the operational amplifier 52 is the sum of the two voltages fed through resistors 51 and 51a. When the system is operating, the output voltage of the limiting amplifier 41 changes, the summed input to the operational amplifier 43 goes to zero and then increases if the output of amplifier 41 is positive, or decreases if the output of the amplifier 41 is negative.

A linear amplifier 54 receives the output signal of the operational amplifier 52 and energizes the coil 29 which, are previously-described, is operatively associated with the magnet 22 in the transducer of FIG. 1. In series with the coil 29 is a resistor 55 having a relatively small value of resistance; and the other side of the resistor 55 is connected to ground. Current which flows through the coil 29 also flows through resistor 55; and the voltage generated across resistor 55 is therefore a measure of the current flowing through the coil 29 which, in turn, is a measure of the force required to displace the membrane 17 back to its original or undisturbed position (at least within the allowed tolerances).

Thus, a voltmeter 56 reading the voltage across resistor 55 displays or records a signal indicative of the intravenous pressure measured by the transducer of FIG. 1.

OPERATION

In understanding the operation of the system, it must first be appreciated that the system is always in a dynamic state when operative — that is, the switch 38 opens and closes at a repetition rate (or cycle rate) well above (preferably by a factor of ten) the dominant mode or frequency of the pressure variation being measured. In the case of measuring venous blood pressure, this dominant frequency is the heart beat, so if the make/break cycle of the system is designed to be 150 cycles per second, it will be sufficient. The mechanical parameters of the system, principally the mass of the moving portions, and the driving electromagnetic force determine this repetition rate.

Figure 3B:
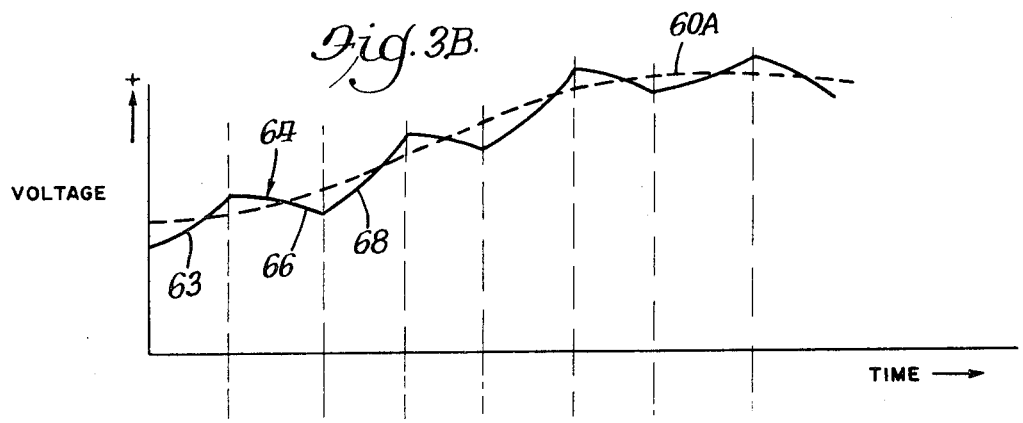
FIG. 3B illustrates the signal output of the measuring system.
Figure 3C:
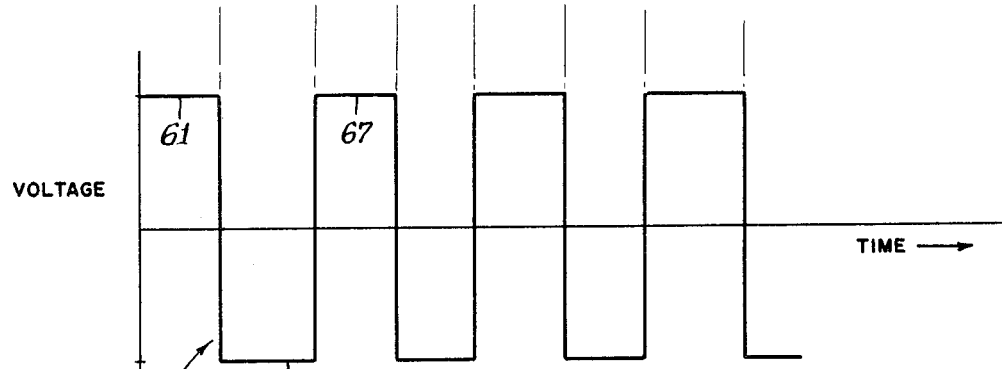
FIG. 3C is a graph illustrating the digital signal representative of the opening and closing of the switch.

Referring then to the transducer of FIG. 1 and the diagrams of FIGS. 3A–3C, it will be assumed that the pressure being measured varies in time according to the curve 60 in FIG. 3A. When the pressure from the measuring side of the daiphragm or membrane 17 exceeds the reference or atmospheric pressure on the driven side of the diaphragm 17, the diaphragm will be displaced in the direction of the magnet 22. Assuming the overall pressure is positive, the average current through the coil 29 is also positive, as illustrated by curve 60A in FIG. 3B. When the switch 38 opens, the voltage of the limiting amplifier 41 switches positive as indicated by the portion 61 of the curve 62 of FIG. 3C. The amplifier 41 energizes the operational amplifier 52 through the nonlinear filter network 42 which delays a rapid change in the output signal of the amplifier 41. The output voltage of the integrator 43 will be an increasing positive voltage indicated by the portion 63 of solid curve 64 of FIG. 3B. This increasing positive voltage will then energize the coil 29 in a manner to force the diaphragm down.

At a certain small downward displacement of the diaphragm 17 (as determined by the setting of the stud 20) the contact 34 will engage the stud 20, thereby closing the switch 38 of FIG. 2. When the switch 38 is closed, the oscillator 39 energizes the limiting amplifier 41; and the output of the limiting amplifier 41 is at a negative voltage as indicated by numeral 65 in FIG. 3C.

The output of the operational amplifier 52 (i.e. integrator 43) will then decrease as at 66 in FIG. 3B to energize the amplifier 54 which, in turn, will slightly reduce the current through the coil 29. The coil 29 reacts with the magnet 22 to reduce the downward force on the diaphragm — that is, downward in the direction of the mouth of the needle 16. The current in the coil will continue to decrease to slightly abate the magnetic force until the diaphragm 17 returns to its position at which switch 38 opens. It can be seen here that by limiting the total movement of the diaphragm and sensing only excursions to fixed positions, a highly sensitive diaphragm can be used, but the compliance error is minimized because of the small constant displacement of the diaphragm over the entire pressure range.

When the dowel 33 and the circular plate 28 to which it is attached have proceeded upwardly to a point at which the contact 34 again disengages the stud 20, the switch 38 is opened thereby changing the output voltage of the limiting amplifier 41 back to a positive voltage, as seen at 67 in FIG. 3C. The output signal of the integrator will again begin to increase as at 68 in FIG.

3B, thereby increasing the current in the coil to close switch 38. During this last cycle, the time during which the switch 38 was closed (represented by the portion 65 of curve 62) was shorter than the time that the switch was open (portion 67). Thus, when these two signals are integrated, the portion 68 of curve 63 will have increased more than the portion 66 will have decreased — thus yielding a positive increase to the average value of the driving current (representing curve 60A) and permitting the system to follow the pressure being measured very accurately.

The operation repeats this cycle to continue to trace the curve 64. The average value over a few cycles of the curve 64 will generate a curve represented by the dashed curve 60A which is representative of the actual pressure curve 60. Thus, the switch 38 makes and breaks at a repetition rate (preferably about 150 times per second) which is very high relative to the normal operating frequency range of changing blood pressure; and the integrated signal generated from this making and breaking action is the signal which controls the average current fed to the energizing coil 29 in such a manner as to reverse the condition of the switch 38.

It will be appreciated that since the dowel 33 is fastened to the top surface of the membrane 17, negative pressure (that is, when the atmospheric pressure is greater than in the conduit of the needle 16) may be measured. In this situation, an average force is generated by the coil 29 to lift the diaphragm away from the mouth of the needle 16. For a negative pressure in the catheter, the average current through the coil (over a number of cycles) will flow in the opposite direction. Thus, both positive and negative pressures may be measured.

In terms of the instantaneous electrical signals, the voltage waveform across the coil 29 comprises a rapidly varying sawtooth (or triangular) signal (curve 64) superposed on a base or slowly changing component (curve 60A). The signal that is measured to get an indication of the pressure is only the average component of the waveform (i.e., curve 60A). A low pass filter in the meter 56 eliminates the more rapidly changing signal component. Even though the measured component is changing more slowly than the sawtooth signal, it nevertheless follows venous pressure changes well. The system exhibits a frequency response high enough to record the instantaneous venous pressure because the repetition rate of the signal that drives the integrator is approximately an order of magnitude higher than the dominant mode of the pressure being measured.

It will be appreciated that the feedback system of the illustrated embodiment is electrical. This is considered an important aspect of the present invention as it allows a very rapid repetition rate of the making and breaking of the switch 38 thus extending the overall frequency response of the transducer. However, a mechanical feedback system was successfully designed and used; and it employs in place of a rigid mechanical coupling to the diaphragm, a counter-balancing pressure on the reference side of the diaphragm. In this latter system, conductive paint was affixed to the reference side of the diaphragm 17 to provide a conduction path from a needle which was located axially of the upper section of the housing. The needle defined a point located slightly upwardly (as viewed in FIG. 1.) of the diaphragm in its relaxed condition. In this case, the housing sections were electrically isolated from each other by means of an insulating gasket; and non-conducting screws secured the two sections of the housing together. When the conducting diaphragm moved a predetermined amount, it engaged the needle fixed in the upper half of the housing and thus completed an electrical circuit between the two sections of the housing. This make/break switch signal generated an electrical signal to control a bellows for increasing and decreasing the pressure on the reference side of the diaphragm. In this embodiment, of course, the reference volume is enclosed. In this manner, the pressure on the reference side of the diaphragm is kept at a level which exactly compensates for the pressure on the measuring side of the diaphragm. Thus, the pressure generated by the bellows is equal to the measuring pressure, and this first pressure is conveniently measured.

It will also be obvious that in place of the switch for generating the electrical feedback signal for controlling displacement of the membrane, a modification could be made in which the movement of the dowel 33 generates an analog electrical signal for feedback control, as by varying the movable arm of a potentiometer in response to movement of the dowel engaging the diaphragm.

Certain structural features of the illustrated embodiment are considered important in maintaining the overall accuracy and frequency response required for such a transducer. One important consideration is minimizing the volume of air on the measuring side of the diaphragm. This is accompanied in the instant invention by keeping the diameter of the catheter and the channels communicating with it at a minimum. An equally important consideration is the provision for a flexible diaphragm (that in the illustrated embodiment is rubber although it could be metal) while limiting the overall displacement of the diaphragm in order to reduce the measuring error caused by compliance.

Having thus described in detail a preferred embodiment of my invention, it will be obvious that certain modifications and substitutions other than those which have already been discussed may be made while continuing to practice the principle of my invention. It is, therefore, intended that all such equivalents and substitutions be covered as they are embraced within the spirit and scope of the appended claims.

I claim:

1. In a system for continuously measuring venous pressure, the combination comprising a conduit having an end adapted to be placed in a vein, a flexible diaphragm having one side in fluid communication with the interior of said conduit; a closed reference volume of air in fluid communication with the other side of said diaphragm; an electrical coil magnet means associated with said coil to exert a force thereon when said coil is energized; means attaching one of said coil and said magnet means to said diaphragm; switch means responsive to the position of said diaphragm for opening a set of contacts when said diaphragm is displaced in one direction from its original position and for closing said contacts when said diaphragm is displaced in the opposite direction; circuit means in circuit with said switch for energizing said coil to force said diaphragm in a direction opposite to its direction of displacement from said original position, said switch operating at a cycle rate greater than the dominant frequency mode of the pressure being measured whereby the average signal energizing said coil over a number of cycles is a measure of venous pressure, said circuit means, said magnet means and said coil comprising a drive means for displacing said diaphragm over approximately the same distance for all ranges of pressure being measured thereby enabling said diaphragm to be highly sensitive without introducing compliance error.

2. The system of claim 1 wherein said circuit means includes a first circuit means connected to said switch means for generating a first constant signal when said means is open and a second constant signal of opposite polarity when said switch means is closed, and a second integrating circuit means responsive to said first circuit means for energizing said coil with an increasing signal of a first polarity in response to said first constant signal and for energizing said coil with an increasing signal of opposite polarity in response to said second constant signal.

3. The system of claim 1 wherein said switch means includes a first contact mounted on said diaphragm and a second contact mounted adjacent to said first contact and adjustable to balance the system before measuring.

4. A system for continuous intravenous blood pressure measurement comprising: air-filled catheter means adapted at one end for insertion in a vein and defining at the other end a chamber; a flexible membrane closing a portion of said chamber; a closed volume on the other side of said membrane providing a reference pressure; feedback means associated with said membrane including a switch having contacts adapted to be closed when said membrane is in a first position consisting of an original position or to one side thereof, said contacts being open when said membrane is in a second position to the other side of said original position, said feedback means including circuit means generating a first electrical forcing signal as long as said switch is closed and a second electrical forcing signal as long as said switch is open, said feedback means generating said first and second forcing signals at a cycle rate greater than the dominant mode of the pressure being measured; force-producing means including an electrical transducer having a coil responsive to said first and second electrical forcing signals and a magnetic member associated with said coil, one of said coil and magnetic member carried by said membrane, said coil receiving said feedback signals for forcing said membrane in a first direction toward said original position in response to said first feedback signal and for forcing said membrane in a direction opposite to said first direction and toward said original position in response to said second feedback signal, whereby the average value of said forcing signals is representative of the pressure being measured thereby enabling said system to measure positive and negative pressures relative to said reference pressure; and means for measuring the average forcing signal.

* * * * *